United States Patent [19]
Drobot et al.

[11] Patent Number: 6,091,067
[45] Date of Patent: Jul. 18, 2000

[54] SCANNING DEVICE USING FIBER OPTIC BIMORPH

[75] Inventors: Adam Thomas Drobot, Annandale; Robert Courtney White, Fairfax, both of Va.

[73] Assignee: Science Applications International Corporation, San Diego, Calif.

[21] Appl. No.: 09/089,138

[22] Filed: Jun. 2, 1998

[51] Int. Cl.[7] .................................................. H01J 3/14
[52] U.S. Cl. ..................................... 250/234; 250/227.11
[58] Field of Search ................................. 250/234, 216, 250/227.11, 578.1, 201.3, 566, 306, 307; 385/12, 13, 115; 235/462.32, 462.33; 359/201

[56] References Cited

U.S. PATENT DOCUMENTS

| | | |
|---|---|---|
| 3,112,360 | 11/1963 | Gregg . |
| 3,892,468 | 7/1975 | Dunguay . |
| 4,058,736 | 11/1977 | Takahashi et al. . |
| 4,135,083 | 1/1979 | Van Alem et al. . |
| 4,193,091 | 3/1980 | Kleuters et al. . |
| 4,234,788 | 11/1980 | Palmer et al. . |
| 4,337,531 | 6/1982 | Willemsen . |
| 4,482,986 | 11/1984 | Noda et al. . |
| 4,507,765 | 3/1985 | Suzuki et al. . |

(List continued on next page.)

OTHER PUBLICATIONS

Abstract of D.E. Brei and J. Blechschmidt, "Design and Static Modeling of a Semicircular Polymeric Piezoelectric Microactuator", (JMEMS, vol. 1, No. 3, p. 106) (no date).
Abstract of K. Minami, S. Kawamura, and M. Esashi, "Fabrication of Distributed Electrostatic Micro Actuator (DEMA)", (JMEMS, vol. 2, No. 3, p. 121 et. seq.) (No date).
Abstract of Q. Meng, M. Mehregany, and R. L. Mullen, "Theoretical Modeling of Microfabricated Beams with Elastically Restrained Supports", (JMEMS, vol. 2, No. 3, p. 128 et. seq.) (No date).
Abstract of M. Ataka, A. Omodaloa, N. Takeshima, and H. Fujita, "Fabrication and Operation of Polyimide Bimorph Actuators for a Ciliary Motion System", (JMEMS, vol. 2, No. 4, p. 146) (No date).
Abstract of J.G. Smits and A. Ballato, "Dynamic Admittance Matrix of Piezoelectric Cantilever Bimorphs", (JMEMS, vol. 3, No. 3, p. 105 et. seq.) (No date).
Abstract of J.W. Judy, R.S. Muller, and H. H. Zappe, "Magnetic Microactuation of Polysilicon Flexure Structures", (JMEMS, vol. 4, No. 4, p. 162) (No date).
Abstract of T.S. Low and W. Guo, "Modeling of a Three-Layer Piezoelectric Bimorph Beam with Hysteresis", (JMEMS, vol. 4, No. 4, p. 230) (No date).
Abstract of Yuji Uenishi, Hidenao Tanaka, and Hiro Ukita, "AlGaAs/GaAs micromachining for monolithic integration of optical and mechanical components", (Proc. SPIE vol. 2291, p. 82–91, Integrated Optics and Microstructures II, Massood Tabib–Azar; Dennis L. Polla; Ka–Kha Wong; Eds. Oct. 1994).

*Primary Examiner*—Que T. Le
*Attorney, Agent, or Firm*—Banner & Witcoff, Ltd.

[57] ABSTRACT

An optical scanner employs a cantilever-mounted optical fiber within a micro electro-mechanical systems (MEMS) motor. In an embodiment, the fiber is sandwiched between two piezoelectric elements to form a unitary bimorph. The bimorph is excited with opposite polarity to cause it to bend rapidly in a plane. The light collected from the tip is projected to a small spot on the scanned medium. The bimorph is oscillated by applying an alternating voltage across the piezoelectric elements which causes the bimorph to bend back and forth at high rates. A medium is passed in a direction at least partly orthogonal to the direction of oscillation of the bimorph so that spot, rapidly sweeping across the surface of the medium, scans the surface. To write information on the medium, a source sufficiently intense, is modulated and applied to the fiber. To read information, a sufficiently intense source is continuously applied to the fiber and a detector used to pick up light returned from the medium surface.

19 Claims, 8 Drawing Sheets

U.S. PATENT DOCUMENTS

| | | |
|---|---|---|
| 4,564,268 | 1/1986 | Tatsuno et al. . |
| 4,572,949 | 2/1986 | Bowers et al. . |
| 4,737,946 | 4/1988 | Yamashita et al. . |
| 4,744,073 | 5/1988 | Sugiki . |
| 4,755,668 | 7/1988 | Davis . |
| 4,763,973 | 8/1988 | Inoue et al. . |
| 4,767,210 | 8/1988 | Kashyap . |
| 4,771,415 | 9/1988 | Taki . |
| 4,815,807 | 3/1989 | Kaneko et al. . |
| 4,858,215 | 8/1989 | Yano et al. . |
| 4,991,160 | 2/1991 | Premji . |
| 5,001,338 | 3/1991 | Boero . |
| 5,010,346 | 4/1991 | Hamilton et al. . |
| 5,070,488 | 12/1991 | Fukushima et al. . |
| 5,109,459 | 4/1992 | Eibert et al. . |
| 5,121,449 | 6/1992 | Shiba et al. . |
| 5,128,915 | 7/1992 | Yamashita et al. . |
| 5,144,604 | 9/1992 | Sugiura . |
| 5,144,616 | 9/1992 | Yasukawa et al. . |
| 5,195,152 | 3/1993 | Gupta . |
| 5,278,812 | 1/1994 | Adar et al. . |
| 5,289,454 | 2/1994 | Mohapatra et al. . |
| 5,293,291 | 3/1994 | Ohki et al. . |
| 5,317,148 | 5/1994 | Gray et al. . |
| 5,354,985 | 10/1994 | Quate ...................................... 250/306 |
| 5,390,157 | 2/1995 | Revelli, Jr. . |
| 5,416,881 | 5/1995 | Ikeda . |
| 5,422,469 | 6/1995 | Bard et al. . |
| 5,444,689 | 8/1995 | Ohki et al. . |
| 5,452,382 | 9/1995 | Shionoya et al. . |
| 5,661,591 | 8/1997 | Lin et al. . |

SCANNING DEVICE USING FIBER OPTIC BIMORPH

BACKGROUND OF THE INVENTION

Various optical scanners are known for such applications as data storage, bar code reading, image scanning (surface definition, surface characterization, robotic vision), and lidar (light detection and ranging). Referring to FIG. 1, a prior art scanner 50 generates a moving spot of light 60 on a planar target surface 10 by focusing a collimated beam of light 20 through a focusing lens 40. If the assembly is for reading information, reflected light from the constant intensity spot 60 is gathered by focusing lens 40 and returned toward a detector (not shown). To write information, the light-source is modulated. To cause the light spot 60 to move relative to the surface 10, either the surface 10 is moved or the scanner 50 is moved. Alternatively, the optical path could have an acousto-optical beam deflector, a rotating prism-shaped mirror, or a lens driven galvanometrically or by piezoelectric positioners. Scanners also fall into two functional groups, raster and vector. Both types generally use the same types of beam deflection techniques.

Higher-speed raster scanners use either spinning prism-shaped (polygonal cross-sectioned) mirrors or multifaceted spinning holograms (hologons). Performance parameters for these conventional beam deflection techniques are listed in Table 1. The discrete optics in these devices are generally attended by high costs for mass manufacture, assembly, and alignment.

TABLE 1

Performance of Conventional Beam Deflectors for Optical Scanning.

| Parameter | Polygonal Mirrors | Galvano-Driven Mirrors | Hologons (Transmission) | Optic Deflectors |
|---|---|---|---|---|
| Wavefront Distortion | $\lambda/8$ at 0.55 $\mu$m | $\lambda/8$ at 0.55 $\mu$m | $\lambda/6$ at 0.55 $\mu$m | $\lambda/2$ at 0.55 $\mu$m |
| area resolution (spot-widths/sec) | 25,000 (scan lens limited) | 25,000 (scan lens limited) | 25,000 (scan lens limited) | 1,000 (scan lens limited) |
| Cross-axis error | 10 arc sec (uncorrected) | 1–2 arc sec (uncorrected) | 10 arc sec | 0 |
| Speed(spot widths/sec) | $1 \times 10^8$ | $2 \times 10^6$ | $2 \times 10^7$ | $2.8 \times 10^7$ |
| Bandwidth | 0.3–20 $\mu$m | 0.3–20 $\mu$m | monochromatic | monochromatic |
| scan efficiency | 80–100% | 65–90% | 90% | 60–80% |

(from The Photonics Design and Applications Handbook 1993, Laurin Publishing Co., Inc., p. H-449)

The performance parameters listed in Table 1 assume different levels of importance depending on the optical scanning application. For faster scanning to cover extended surface areas, the emphasis is on speed, area resolution, and scan efficiency. Wide bandwidth is needed if the surface is to be color-scanned. For applications requiring vector scanning of precise paths at high resolution, the optical system typically uses a monochromatic, focused spot of light that is scanned at high speed with low wavefront distortion and low cross-axis error. Optical data storage has been a prime application of this type of optical scanning.

In optical data storage media, information is stored as an array of approximately wavelength-size dots (cells) in which some optical property has been set at one of two or more values to represent digital information. Commercial read/write heads scan the media with a diffraction-limited spot, typically produced by focusing a collimated laser beam with a fast objective lens system as shown in FIG. 1. A fast objective lens, one with a high numerical aperture, achieves a small spot size by reducing Fraunhofer diffraction. The spot is scanned by moving an assembly of optical components (turning mirror, objective lens, position actuators) over the optical medium, either along a radius of a disc spinning under the spot or across the width of a tape moving past the head. The assembly moves in one dimension along the direction of the collimated laser beam. As the disk spins or the tape feeds, the line of bit cells must be followed by the spot with sufficient precision to avoid missing any bit cells. The fine tracking is achieved by servo mechanisms moving the objective lens relative to the head assembly. An autofocus servo system is also necessary to maintain the diffraction limited spot size because the medium motion inevitably causes some change in the mean/medium separation with time. Light reflected form the medium is collected by focusing optics and sent back along the collimated beam path for detection. Scanning by several spots simultaneously is used to achieve high data rates through parallelism in one known system called the CREO® optical tape system.

One scanning device that avoids reliance on discrete optical elements to achieve scanning is described in U.S. Pat. No. 4,234,788. In this scanner, an optical fiber is supported rigidly at one end in a cantilevered fashion. The supported end of the fiber is optically coupled to a light emitting diode or photo diode for transmitting or receiving light signals, respectively. The fiber is free to bend when a force is exerted on it. The fiber can thus be made to scan when light from the light-emitting diode emanates from the tip of the fiber as the fiber is forced back and forth repeatedly. To make the fiber wiggle back and forth an alternating electric field, generally perpendicular to the axis of the fiber, is generated. The fiber is coated with a metallic film. A charge is stored on the film, especially near the tip, by forming a capacitance with a metalized plate oriented perpendicularly to the fiber axis (optically at least partly transparent). The stored charge makes the fiber responsive to the electric field.

A drawback of this device is the limit on the speeds with which the fiber can be made to oscillate based on mechanical properties. The device requires a series of elements to move the fiber: an external field-generating structure, a DC voltage source to place charge on the fiber coating, and an AC source to generate the external field. Another drawback of this prior art mechanism is the inherent problem of stress fractures in the fiber optics. Bending the fiber repeatedly places serious demands on the materials. Problems can arise due to changes in optical properties, changes in the mechanical properties causing unpredictable variation in the alignment of the plane followed by the bending fiber, the amplitude of vibration, the natural frequency of vibrations, and structural failure. Still another limitation is imposed by the need to place a conductor between the fiber tip and the optical medium to form the capacitance. This places another optical element between the fiber tip and the scanned surface and makes it impossible to sweep the tip very close to the scanned surface as may be desired for certain optical configurations.

Another prior art scanning device is described in U.S. Pat. No. 5,422,469. This patent specification describes a number of different devices to oscillate the end of an optical light guide or optical fiber. One embodiment employs a piezoelectric bimorph connected to the free end of a device to which the free end of an optical fiber and a focusing lens are attached. Reflected light is directed back through the fiber to a beam splitter which directs the reflected light out of the bidirectional (outgoing/return) path at some point along the fiber remote from the source of light. The above embodiment uses a simpler prime mover, a piezoelectric bimorph. However, the need for a focusing lens attached to the end of the fiber, by increasing the mass, imposes difficult practical requirements for high speed oscillation of the fiber. In addition, to achieve very small projected spot size requires a high numerical aperture at the output end of the focusing optics. It is difficult to achieve this with the conventional optics contemplated by the '469 disclosure. Furthermore, the reciprocation of the fiber as described in the '469 patent requires a multiple-element device. Friction between the motor and the fiber can cause changes in the optical properties of the fiber, and mechanical changes in the motor, the fiber, or the interface, that result in changes (which may be unpredictable) in the amplitude of oscillation or the resonant frequency of the motor-fiber combination (which might generate, or be susceptible to, undesired harmonics). Also, the process of assembly of such a combination of a motor and a fiber presents problems. Ideally, for high frequency operation, the device would be very small.

Common to all storage/retrieval devices is the need for greater and greater data rates. Increases in speed have been achieved by increasing the speed of scanning. However, there are practical limits, particularly with regard to the writing operation, relating to physical properties inherent in the optical media.

Also common to the applications of optical scanning technology is the need for great precision in the focus of the scanning light source and the return signal.

SUMMARY OF THE INVENTION

An optical scanner employs a cantilever-mounted optical fiber within a micro electro-mechanical systems (MEMS) motor. In an embodiment, the fiber is sandwiched between two piezoelectric elements to form a unitary bimorph. The opposite piezoelectric elements are excited with opposite polarity from an AC source causing the bimorph to bend rapidly in a plane. The light collected from the tip is projected to a small spot on the scanned medium. The bimorph is oscillated by applying an alternating voltage across the piezoelectric elements which causes the bimorph to bend back and forth at high rates. A medium is passed in a direction at least partly orthogonal to the direction of oscillation of the bimorph so that spot, rapidly sweeping across the surface of the medium, scans the surface. To write information on the medium, a source sufficiently intense, is modulated and applied to the fiber. To read information, a sufficiently intense source is continuously applied to the fiber and a detector used to pick up light returned from the medium surface.

According to an embodiment, the invention provides a scanning device for scanning a target surface. The device includes a base with a focusing optical element of approximately 1:1 magnification. A flexible element with a light source is cantilever-mounted to the base. It has a light-emitting region at its tip, which is remote from the end at which it is mounted to the base. Light from the light source diverges from the light-emitting region with a numerical aperture of approximately 0.5. The flexible element is of a material, which changes shape in response to an applied stimulus such that application of the stimulus causes the flexible element to bend. The light-emitting region is positioned such that the light diverging from the light-emitting region is focused on the target surface and the flexible element is oriented with respect to the focusing optics and the target surface such that when the flexible element bends, the light diverging from the light-emitting region remains sufficiently in focus on the target surface. In a variant, the material includes a piezoelectric substance. The flexible element may include a first layer of piezoelectric material and a light guide adjacent the first layer of piezoelectric material with a second layer of piezoelectric material adjacent the light guide on a side of the light guide opposite the first layer of piezoelectric material. The first and second layers and the light guide may be bonded together to form a unitary flexible structure. The stimulus could be an AC voltage with an AC source connected to the flexible element to apply the stimulus. The flexible element may include a light guide of material having a defect migration rate lower than the frequency of the AC voltage. Another preferred option is to provide that the frequency of the AC voltage be greater than the resonant frequency.

According to still another embodiment, the invention provides a scanning device for scanning a target surface. The device has a base with a flexible element cantilever-mounted to the base. A light source emits light through a light-emitting region at a tip remote from the end at which the flexible element is mounted. Focusing optics are positioned with respect to the tip to focus light emitted from the tip onto the target surface. The flexible element includes an optical fiber embedded inside. The optical fiber optically connects the light source and the tip. In a variation, the flexible element is substantially of a material that changes shape in response to an applied voltage such that application of an AC voltage to the flexible element causes the flexible element to bend reciprocally.

According to another embodiment, the invention provides a scanning device for scanning a target surface. The device has a base with a flexible element, cantilever-mounted to it. The flexible element has a light guide with a light-emitting tip. An input end of the light guide is connectable to a modulatable source of light. The tip is arranged on the base and positioned relative to the target surface to cast a limited-size spot of light on the target surface. The flexible element includes a first layer of piezoelectric material with a light guide adjacent to it. It also has a second layer of piezoelectric material adjacent the light guide on an opposite side. The first and second layers and the light guide are bonded together to form a unitary flexible structure. Optionally, the bimorph is positioned with respect to the target surface to bend, when a voltage is applied to the first and second layers, in a direction parallel to the target surface. The device may include an alternating voltage supply that applies voltage to the first and second layers of piezoelectric material such that the flexible element extends as it bends. This may cause the tip to be forced to remain substantially along a straight line when the flexible element is oscillated by application of the alternating voltage to the first and second layers.

Instead of a separate fiber, the bimorph may be formed photo-lithographically using optoelectronic chip-manufacturing techniques similar to those used for the manufacture of semiconductors. The laser can be integrated directly into the bimorph element.

Preferably, the lens system used to focus the light has a high numerical aperture and also has a magnification approximately equal to unity. The lens system could be made from a single holographic element. The light-emitting tip of the bimorph, ideally, remains in the focal plain during the sweep resulting from its oscillation so that the scan spot remains small, defined, and of consistent size. Since the bimorph bends as it oscillates, its axial position varies during its sweep. Various methods are proposed for keeping the light spot in focus. These include using non-conventional optics that have a curvilinear image plane. Another approach is to arrange the bimorph and base so that the bimorph oscillates in a direction perpendicular to the optical axis. This would cause the movement of the spot on the medium surface to be curved. Still another method is to drive the bimorph from a voltage source that causes both piezoelectric elements to stretch when the fiber is bent and to contract when it is straight so that the path of the tip is straight as the bimorph sweeps.

A beam splitter may be used along the return path of the light to collect reflected light and send it along a final leg of a return path so that the return light can be directed to a detector rather than back to the laser source. Optimally, the effective magnification of the focusing optics is 1:1. This is a result of the need for high numerical aperture at the output tip and the desire to minimize off-axis displacement of the bimorph tip (to minimize axial displacement when bent). dr

DETAILED DESCRIPTION OF THE EMBODIMENTS

Figure 1:
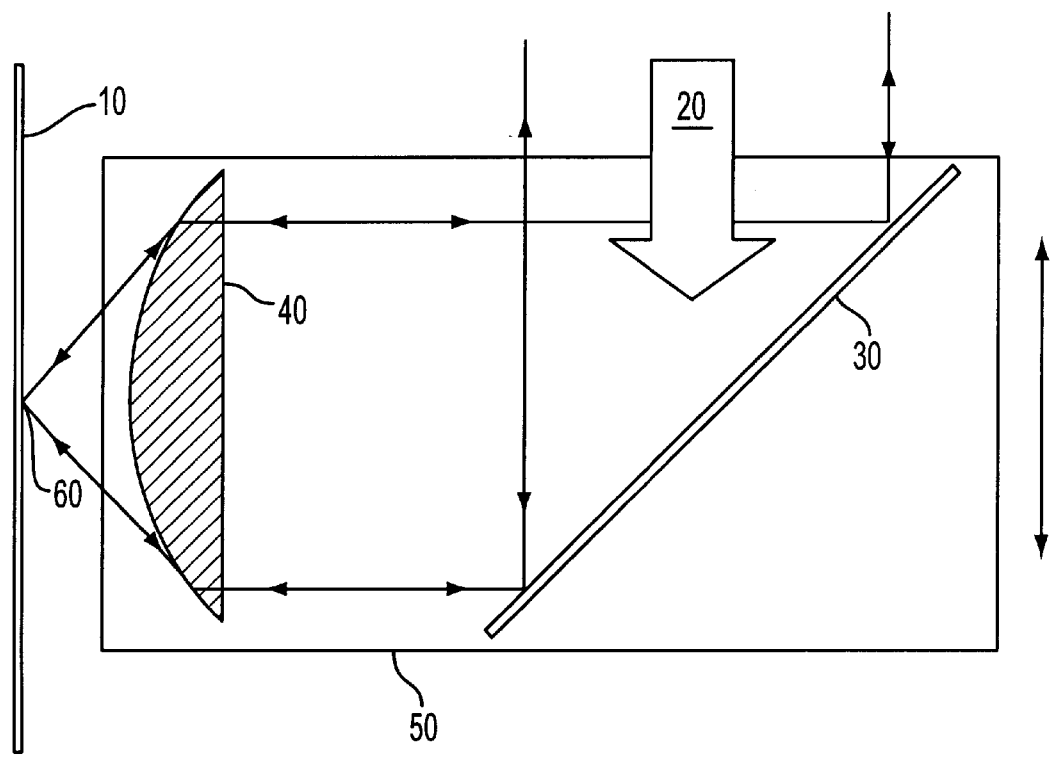
FIG. 1 is a ray trace diagram showing a scanning device according to the prior art.
Figure 2A:
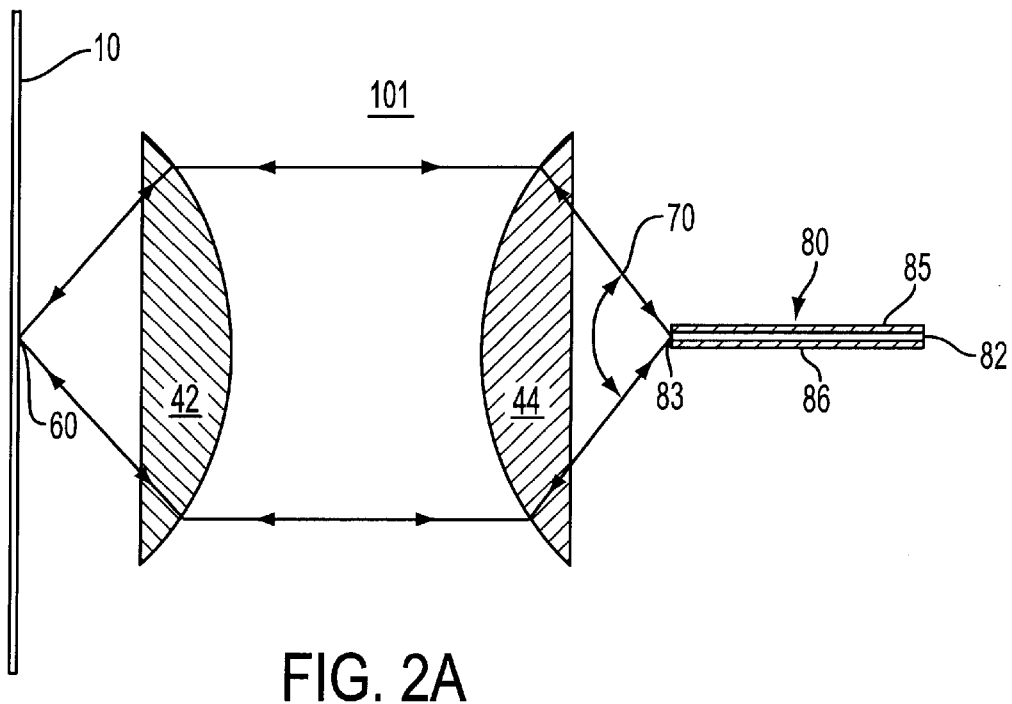
FIG. 2A is a ray trace diagram showing cantilever bimorph emitting light which is imaged onto a target surface and receiving return light from the target surface.
Figure 2B:
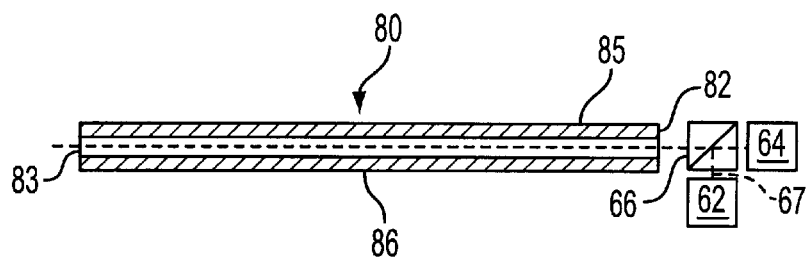
FIG. 2B is a section view of the bimorph of FIG. 2A showing, schematically, a laser source and a detector.

Referring to FIG. 2A, a scanning device 101 according to an embodiment of the invention employs a laser source (not shown in FIG. 2A but shown at 64 in FIG. 2B), which could be fundamental mode or multimode. Light from the laser source is led into one end of a wave-guide, in the present embodiment, an optical fiber 82 embedded between two pieces of piezoelectric material 85 and 86 that form a bimorph/fiber element 80. The tip 83, of optical fiber 82 is constructed to cause light emitted from it to diverge with a high numerical aperture ratio; of the order of 0.5. A fast lens system 46, with lenses 42 and 44, focuses light from the tip to a diffraction-limited spot on a scanned surface 10. Vibration of optical fiber 82 is achieved by embedding it in a cantilever bimorph 80 designed to bend in response to an applied stimulus such as an electric field. The piezoelectric bimorph 80 has two strips of piezoelectric material 85 and 86 joined lengthwise. Electrodes are attached in such a way as to induce elongation of one strip and contraction of the opposite strip when an electric field is applied. This action results in a bending motion of the unitary fiber/bimorph element 80. When the field is reversed, the bending motion is reversed in direction, causing a vibrating motion when an AC voltage is applied continuously. A 4×4 matrix relates the driving parameters to the response parameters. As bimorph 7 vibrates, the spot at the tip of fiber 1 is swept in an arc-shaped path. Note that the lens system could be made from a single holographic element (not shown). The effective size of the light source is the Gaussian beam waist of the fundamental mode within the fiber tip. Note that the lens system could be made from a single holographic element (not shown). Fiber tip 83 is positioned so that it is substantially in the focal plane that is precisely imaged by lens system 46 onto surface 10 to form a light spot 60. Referring now also to FIG. 2B, in using scanning device 101 to read information from scanned surface 10, reflected light from spot 60 is focused by fast lens system 46 back onto the tip of fiber/bimorph element 80. Any stray reflected light coming from areas not precisely aligned with spot 60 is rejected because the tip of fiber 82 acts as an aperture stop. A beam splitter 66, or bidirectional coupler (not shown), may be used along the return path to collect reflected light and send it along a final leg of a return path 67 so that the return light can be directed to a detector 62 rather than back to the laser source 64.

Figure 3:
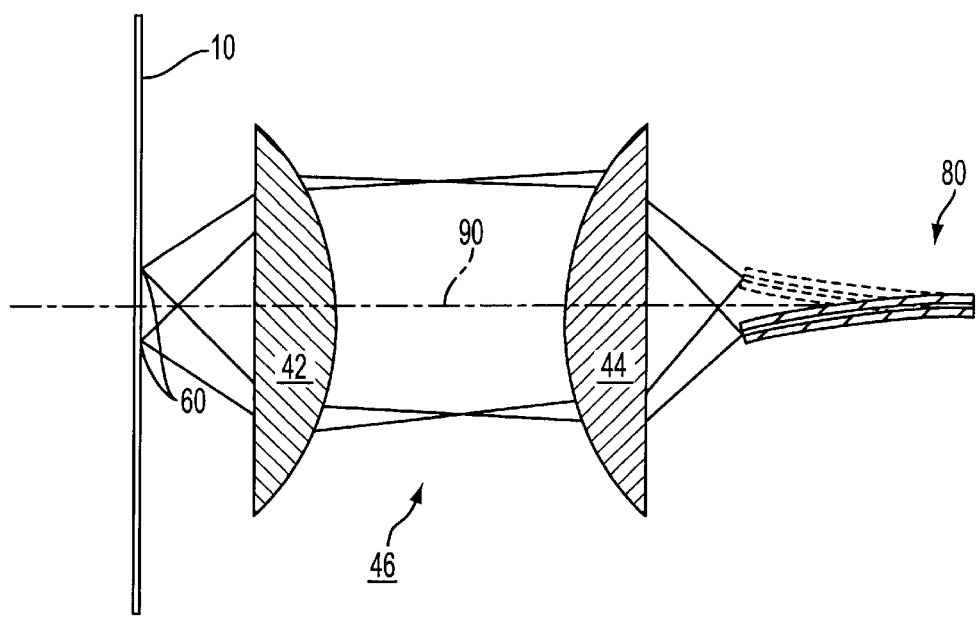
FIG. 3 is a ray trace diagram showing extreme positions of a cantilever mounted bimorph of FIG. 2A.

Referring to FIG. 3, optimally, the effective magnification of lens system 3 is 1:1 for the following reasons. First, it is desirable to insure that the numerical aperture at the output end be as high as possible to limit Fraunhofer diffraction thereby maximizing the resolution of the spot-projection. Thus a high numerical aperture at the output (scanned surface) end of the focusing optics is desirable. At the input (laser) end of the focusing optics, it is desirable to minimize the off-axis displacement of the light source. That is, it may be desirable lo limit the sweep of the tip of the fiber/bimorph element 80 to limit strain on the element 80 and to limit the (longitudinal) displacement of the tip 83 relative to the plane of points that are focused onto the scanned surface 10 (a plane that is perpendicular to the optical axis 90) so the spot 60 is not out of focus at the extremes of the sweep. On the other hand it is desirable to maximize the sweep of the projected spot 60. A narrow sweep of the fiber/bimorph 80 can translate into a large sweep of the spot 60 if the focusing optics have high magnification and high quality optics. This translates to fast optics and a high numerical aperture at the input of the bimorph. Thus, according to the preferred embodiment, the focusing optics are designed with as high numerical aperture as practical at the input and output ends and thus, with approximately 1:1 magnification. In the preferred embodiment, taking into account practical issues of real-world optics, a numerical aperture of approximately 0.5 is about as high as can be achieved.

With the optical properties discussed above, the focused laser spot will scan over the surface when the fiber tip is moved relative to the optical axis. In a nominal lens system design with 1:1 magnification, the spot moves along the scanned surface the same distance that the fiber tip moves perpendicular to the optical axis. Of course, since the fiber is bending, the path swept by the tip is arc-shaped so that the tip does not remain in the plane that is focused on the scanned surface. Error in the focus of the optics can be minimized if the amplitude of the reciprocating movement is kept small. In this invention, fiber 80 is vibrated to produce a regular oscillatory motion of the fiber tip and the consequent scanning motion of the focused light spot across the surface.

Figure 4:
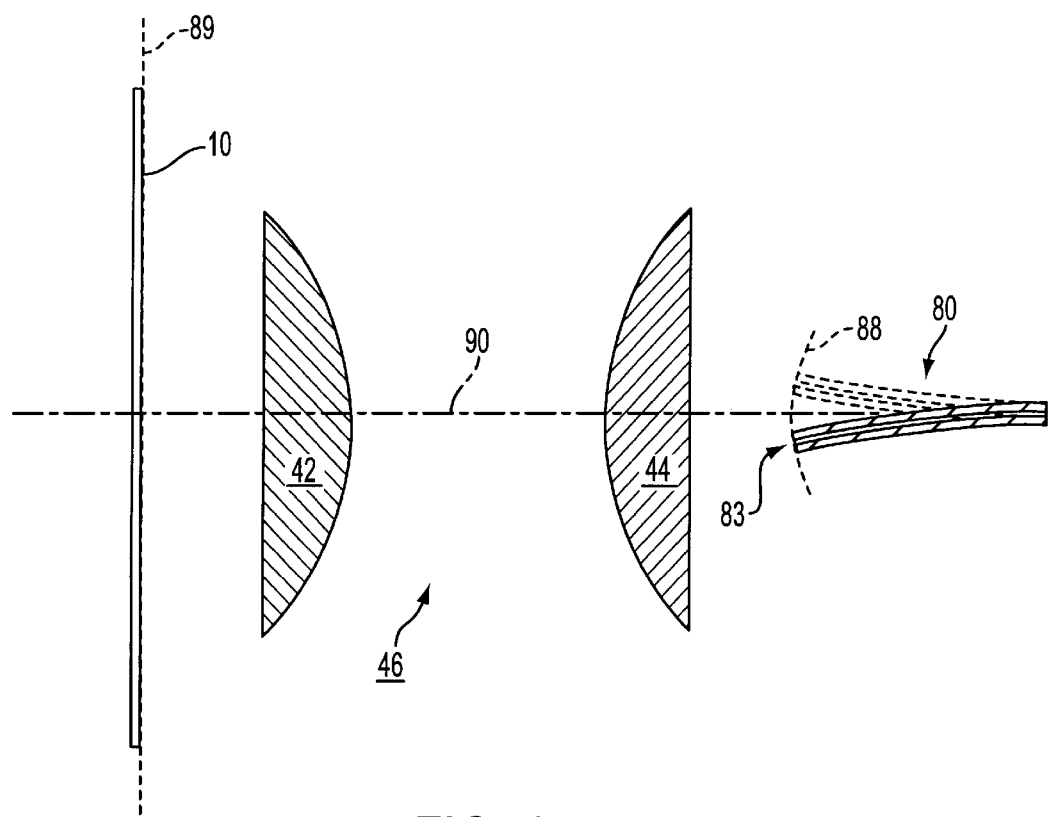
FIG. 4 is a diagram illustrating a path followed by a tip of the bimorph of FIG. 2A as the bimorph bends.

Referring to FIG. 4. focusing error caused by the arc-shaped sweep of the fiber tip may be ameliorated not only by reducing the amplitude of the vibration of fiber/bimorph element 80, but also by the use of certain non-conventional optics. Specifically, focusing optics may be shaped to image the locus of points defined by the curved path of sweep 88 of the fiber/bimorph element 80 tip 83 onto the plane 89 of the scanned surface 10. That is, the optics may be designed such that the tip 83 remains in focus at all cross-axis positions of tip 83.

Figure 5:
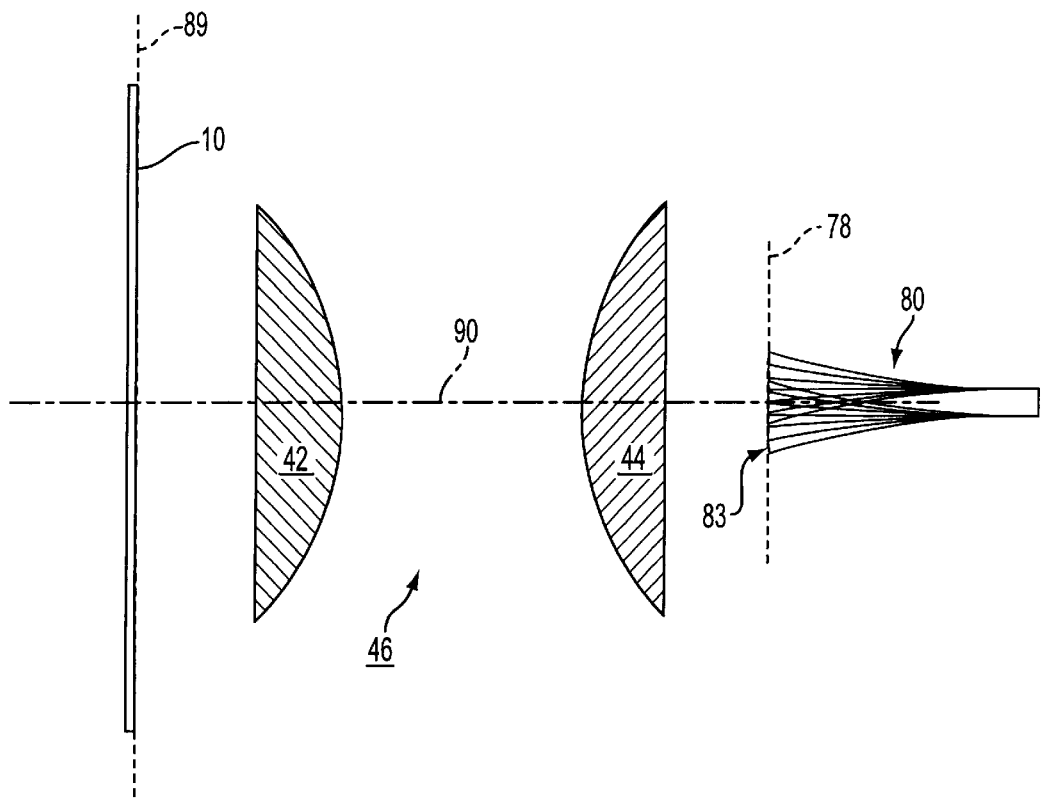
FIG. 5 is a diagram illustrating a path followed by a tip of an alternate embodiment of a bimorph which is constructed or excited such that the tip follows a straight path.

Referring to FIG. 5, still another way to ameliorate focusing error caused by the tendency of the fiber/bimorph element 80 to move axially as it bends away from the optical axis is to drive it in such a way that the tip 83 actually remains in a plane 78. This can be done in two ways or by a combination of the two. The first way is to apply voltage to the piezoelectric elements such that the elements are extended as the tip moves away from the optical axis and contracted as the tip moves toward the axis. That is, the bimorph is stretched as it moves away from the axis and compressed as it moves toward the axis. This is done by insuring, the driving voltage differential causes the bending of the fiber/bimorph element and the net driving voltage produces elongation and contraction. Thus, the driving AC voltages applied to the two piezoelectric layers is generated so that the difference between the instantaneous voltages is an oscillating function that is symmetric about zero voltage difference. The other way is to manufacture the bimorph/fiber element of composite materials stressed such that when the fiber/bimorph elements 80 bends, it simultaneously stretches. Thus, the tip 83 tends to remain in a plane rather than sweeping an arc.

Figure 6:
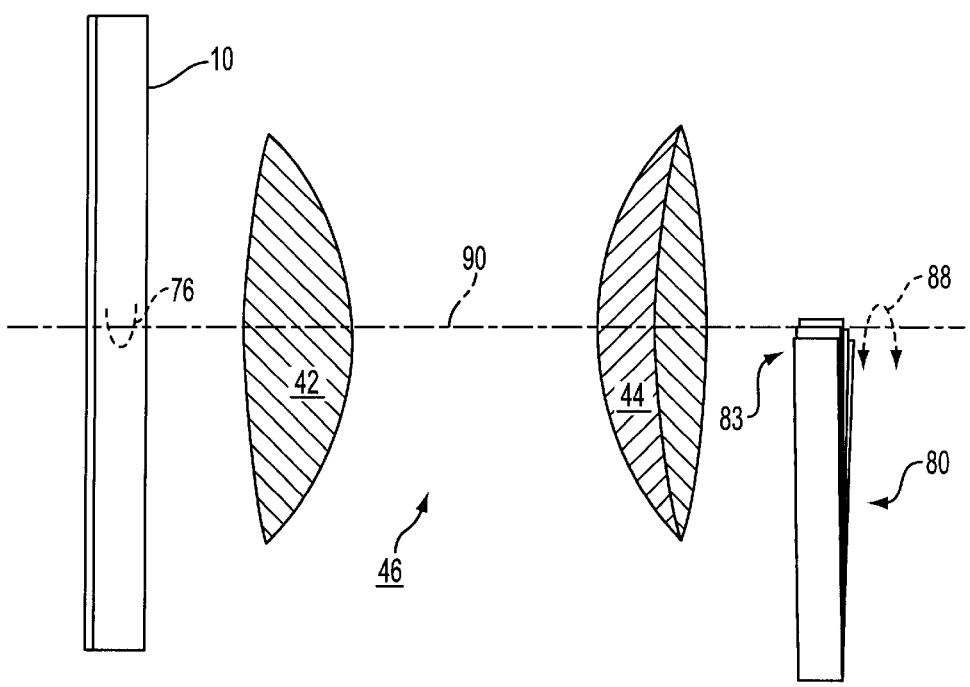
FIG. 6 is a diagram showing an alternative way of cantilever-mounting a bimorph to achieve constant axial position of the tip during bending.

Referring to FIG. 6, still another way to ameliorate the focusing error caused by bending is to position the fiber/bimorph element 80 such that the arc 88 of the sweep of tip 83 lies in a plane perpendicular to the optical axis. The spots then scan a curved path 76 on the scanned surface 10. It is desirable for the surface to be written and read with the same arc-shaped sweep so that the bit cells are aligned properly for both operations. In the arrangement of FIG. 6, light must exit the fiber tip 83 perpendicularly to the fiber axis. This may accomplished for example using mirrors, lenses, etc. at the fiber tip 83.

As described above, this invention produces a scanning motion of a diffraction limited spot on a surface at high speeds with low optical distortion just as the prior art devices do but with various advantages including lower cost of manufacture. Calculated beam deflection parameters of the invention are shown in Table 2.

TABLE 2

Calculated Beam Deflection Parameters of the Invention for Optical Scanning.

| Parameter | Vibrating OPWW Fiber |
|---|---|
| Wavefront distortion | $\lambda/10$ at 0.55 $\mu$m (focusing lens limited) |
| Area resolution (spots/line) | 100–1000 |
| Cross-axis error | (depends on drive system -not yet determined) |
| Speed (spot-widths/sec) | at least $2 \times 10^7$ |
| Bandwidth | (fiber dependent) |
| Scan efficiency | 100% |

The invention design has the following advantages over the prior art:

1) It uses motion of the bimorph tip alone with virtually no friction or wear to produce scanning of the spot on the surface, rather than motion of a mechanically mounted ensemble of several discrete optical components as in some prior art.

2) It incorporates a MEMS drive that can be fabricated by processing steps similar to semiconductor lithography to replace the high-precision, mechanical servo systems required in some prior art with resulting savings in complexity, size, mass, assembly stages, alignment requirements, and cost.

3) It is intrinsically capable of very high scan speeds (e.g., using vibration frequencies above 100 kHz, depending on the mass of the fiber and on the drive mechanism used) because of the low moving mass involved and the nature of the drive system. When the fiber is vibrated at a frequency above resonance and above the reciprocal of the fiber material defect migration time, long lifetimes are expected. The high speeds are achieved with low wavefront distortion.

Ideally, the vibration rate should be higher than either of the resonance frequency of the bimorph device and the reciprocal of the defect migration time of either the light-guide or the piezoelectric materials. Vibrating the bimorph at these rates and above will reduce the failure and material property changes (changes affecting mechanical and optical properties) produced by internal stresses resulting from vibration.

The best MEMS scanning method depends on the practical engineering tradeoffs attending the specific application. For example, the mass of the moving element, the amplitude of the oscillation, and the frequency. One optimization goal might be to opt for high frequency and therefore favor minimum mass of the moving element. This would suggest an individual fiber is best. Engineering, however, places other constraints on the application, for example, the actual position of the surface emitting the light relative to the focal point of the optics. See for example, Brei et. al, incorporated herein by reference below.

Regarding the manufacturing of MEMS devices, for example, the light emitting aperture, shape and surface treatment, many solutions exist for manufacturing issues. For example methods have been developed to apply metals to glass fibers to enable capacitive coupling for driving the fiber motion. Individual methods of fabrication and then manufacture may be addressed depending on the availability of resources, e.g. metalization of a polymer "fiber" or waveguide, or application of piezoelectric material to a polymer. Regarding the optical properties of the fiber output, particularly with regard to numerical aperture (NA), some trial and error experimentation may be required to achieve an optimum configuration. If constructed layer by layer, the fiber tip construction is totally conventional. The optical quality and properties of the exit aperture as mentioned above are critical, and therefore exact recipes may require some trial and error experimentation. For example, a graded index clad may be necessary, or new process methods due to required design considerations. In an embodiment employing an optical fiber, the exit aperture may be defined by cleaving. In embodiment employing a multilayer (e.g. polymer) structure, processing at the end of the fiber is important. Conventional methods at present include ion beam "polishing" of the tip or exit aperture.

The cantilever "style" vibrating fiber structure requires a waveguiding "core," as with any optical fiber. Also a cladding is required to confine the optical energy. The fiber, or, more generally, light guide, can have a round, square, or rectangular cross section depending on design considerations for the purpose of light "piping." A square or rectangular cross section is easiest to deal with from a manufacturing and fabrication point of view, as well as from the point of view of driving oscillations. Planar "capacitive" plates are easily implemented in a layered, bimorph configuration that optimizes energy transfer for driving oscillation while minimizing the required power. However, this puts severe constraints on optical design due to the need for polarization conservation elsewhere in the system, as well as mode conservation and balance. A layer by layer fabrication process is the best approach; in that case, the "fixed end" of the fiber is on top of the underlying structural and functional layers. The quality checks necessary are both optical and mechanical. Longevity will be related to mechanical work, with frequency, total number of oscillations, material, composite structures, adhesion, etc. also being contributing factors.

Note, regarding a fundamental mechanism of failure in stressed single crystal materials, such as Si, defects in single crystals diffuse thermally and aggregate in the material. This is well known (see for example Silicon Processing for the VLSI Era, S. Wolf and R. N. Tauber, Lattice Press and other books addressing the processes in Si fabrication, particularly crystal growth).

Note that various embodiments could make use of the same lasers for both reading and writing, as discussed above. In such a case, a head could have separate exit apertures for reading and for writing, or have one set of apertures serving both functions.

Figure 7:
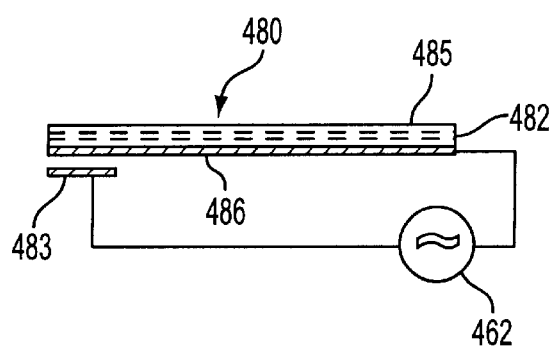
FIG. 7 is a side view of a cantilever-mounted flexible element that oscillates due to the presence of an alternating external electric field generated between the flexible element and a stationary electrode.

Note also that instead of vibrating the flexible light-emitting element using the piezoelectric effect, the flexible element could be vibrated using an alternating electric field. For example, referring to FIG. 7, a bimorph element 480 of a flexible material 485 has an electrode, a conductive layer 486, laminated to it. Another electrode 483 is connected to the base upon which the bimorph element 480 is positioned adjacent the free end of the bimorph 480. An alternating voltage source 462 creates an alternating electric field between the two electrodes 483 and 486 causing the bimorph 480 to bend in alternating directions.

Note also that instead of fabricating a bimorph of two layers of piezoelectric material, a bimorph could be formed of one layer of piezoelectric material and one layer of flexible material. The bimorph would rely on the restoring force supplied by flexible material to cause the vibration. That is, an alternating field may be applied to the piezoelectric layer to cause the piezoelectric layer to alternately contract and stretch, contract and relax, or stretch and relax. With the restoring force of the flexible layer, the bimorph element may vibrate in a manner similar to the two-piezoelectric layer bimorph.

Figure 8:
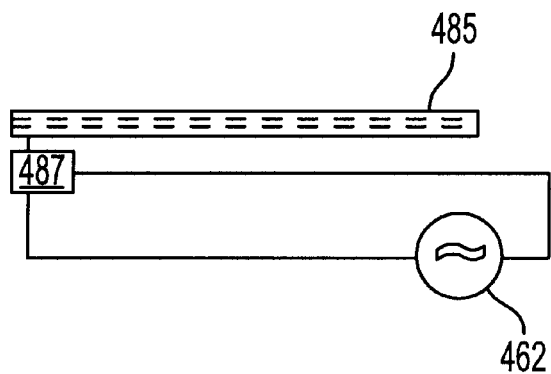
FIG. 8 shows an embodiment which includes an oscillating motor for applying stimulus to the flexible element.

FIG. 8 shows an embodiment which includes an oscillating motor 487. Oscillating motor 487 applies a stimulus to flexible material 485. The application of the stimulus causes flexible material 485 to change shape. The flexible material 485 preferably includes a light guide being of material having a defect migration rate less than a frequency of said oscillating motor.

The respective entireties of the following United States patent applications, filed concurrently herewith, are hereby incorporated by reference in the present application:

Multiple Parallel Source Scanning Device (Adam Thomas Drobot, Robert Courtney White, Newel Convers Wyeth), Ser. No. 09/089,137, filed Jun. 2, 1998.

Multiple Channel Data Writing Device (Adam Thomas Drobot, Robert Courtney White, Newel Convers Wyeth, Albert Myron Green), Ser. No. 09/089,136, filed Jun. 2, 1998.

Multiple Channel Scanning Device Using Optoelectronic Switching (Adam Thomas Drobot, Robert Courtney White, Newel Convers Wyeth), Ser. No. 09/088,782, filed Jun. 2, 1998.

Method and Apparatus for Controlling the Focus of a Read/Write Head for an Optical Scanner (Edward Alan Phillips, Newel Convers Wyeth), Ser. No. 09/088,781, filed Jun. 2, 1998.

Multiple Channel Scanning Device Using Oversampling and Image Processing to Increase Throughput (Adam Thomas Drobot, Robert Courtney White, Newel Convers Wyeth, Albert Myron Green, Edward Alan Phillips), Ser. No. 09/088,780, filed Jun. 2, 1998.

The respective entireties of the following references, which contain nonessential subject matter are hereby incorporated by reference in the present application:

M. Ataka, A. Omodaka, N. Takeshima, and H. Fujita, "Fabrication and Operation of Polyimide Bimorph Actuators for a Ciliary Motion System", JMEMS, Volume 2, No. 4, page 146.

D. E. Brei and J. Blechschmidt, "Design and Static Modeling of a Semicircular Polymeric Piezoelectric Microactuator", JMEMS, Volume 1, No. 3, page 106.

J. W. Judy, R. S. Muller, and H. H. Zappe, "Magnetic Microactuation of Polysilicon Flex-ure Structures", JMEMS, Volume 4, No. 4, page 162.

T. S. Low and W. Guo, "Modeling of a Three-Layer Piezoelectric Bimorph Beam with Hysteresis", JMEMS.

Q. Meng, M. Mehregany, and R. L. Mullen, "Theoretical Modeling of Microfabricated Beams with Elastically Restrained Supports", JMEMS, Volume 2, No. 3, page 128 et. seq.

K. Minami, S. Kawamura, and M. Esashi, "Fabrication of Distributed Electrostatic Micro Actuator (DEMA)", JMEMS, Volume 2, No. 3, page 121 et. seq.

J. G. Smits, and A. Ballato, "Dynamic Admittance Matrix of Piezoelectric Cantilever Bi-morphs", DEEMS, Volume 3, No. 3, page 105 et. seq.

Yuji Uenishi, Hedeno Tanaka, and Hiroo Ukita, NTT Interdisciplinary Research Laborato-ries (Tokyo, Japan), "AlGaAs/GaAs micromachining for monolithic integration of optical and mechanical components", Optical power driven cantilever resonator. Proceedings SPIE et. seq.

What is claimed is:

1. A scanning device for scanning a target surface, comprising:

a flexible element with a light source, cantilever-mounted to a base, having a light-emitting region at a tip remote from a mounting end at which said flexible element is connected to said base;

said flexible element being of a material which changes shape in response to an applied stimulus so that application of said stimulus causes said flexible element to bend;

said light-emitting region being positioned so that said light diverging from said light-emitting region is focused on said target surface and said flexible element being oriented with respect to a focusing optical element and said target surface so that when said flexible element bends, said light diverging from said light-emitting region remains in focus on said target surface.

2. A device as in claim 1, where said focusing optical element is characterized by a magnification factor of approximately 1:1.

3. A device as in claim 1, wherein said tip is so that light from said light source diverges from said light-emitting region with a numerical aperture of approximately 0.5.

4. A device as in claim 1, wherein said material includes a piezoelectric substance.

5. A device as in claim 1, wherein said flexible element includes:
   a first layer of piezoelectric material;
   a light guide adjacent said first layer of piezoelectric material;
   a second layer of piezoelectric material adjacent said light guide on a side of said light guide opposite said first layer of piezoelectric material;
   said first and second layers and said light guide being bonded together to form a unitary flexible structure.

6. A device as in claim 1, further comprising:
   said stimulus being a voltage;
   an AC voltage source connected to said flexible element to apply said stimulus to said flexible element;
   said flexible element including a light guide of material having a defect migration rate; and
   a frequency of said AC voltage being greater than said defect migration rate.

7. A device as in claim 1, further comprising:
   said stimulus being a voltage;
   said flexible element having a resonant frequency of vibration;
   an AC voltage source connected to said flexible element to apply said stimulus to said flexible element;
   said flexible element including a light guide of material having a defect migration rate; and
   a frequency of said AC voltage being greater than said resonant frequency.

8. A device as in claim 5, wherein:
   said flexible element includes a light guide of material having a defect migration rate; and
   said frequency of said AC voltage is greater than said defect migration rate.

9. A scanning device for scanning a target surface, comprising:
   a base;
   a flexible element with a light source, cantilever-mounted to said base, having a light-emitting region at a tip remote from a mounting end at which said flexible element is connected to said base;
   focusing optics positioned with respect to said tip to focus light emitted from said tip on said target surface;
   said flexible element including an optical fiber embedded therein, said optical fiber optically connecting said light source and said tip.

10. A device as in claim 9, wherein said flexible element is substantially of a material that changes shape in response to an applied voltage so that application of an AC voltage to said flexible element causes said flexible element to bend reciprocally.

11. A scanning device for scanning a target surface, comprising:
    a base with a flexible element, cantilever-mounted thereto;
    said flexible element having a light guide with a light-emitting tip;
    an input end of said light guide connectable to a modulatable source of light;
    said tip being arranged on said base and positioned relative to said target surface to cast a limited-size spot of light on said target surface;
    said flexible element including a first layer of piezoelectric material with a light guide adjacent thereto, a second layer of piezoelectric material adjacent said light guide on a side of said light guide opposite said first layer of piezoelectric material;
    said first and second layers and said light guide being bonded together to form a unitary flexible structure.

12. A device as in claim 11, wherein said flexible element is positioned with respect to said target surface to bend, when a voltage is applied to said first and second layers, in a direction parallel to said target surface.

13. A device as in claim 12, further comprising an alternating voltage supply that applies voltage to said first and second layers of piezoelectric material so that said flexible element extends as it bends, whereby said tip is forced to remain substantially along a straight line when said flexible element is caused to oscillate by application of said alternating voltage to said first and second layers.

14. A scanning device for scanning a target surface, comprising:
    a base having a focusing optical element of approximately 1:1 magnification;
    a bimorph with a light source, cantilever-mounted to said base, having a light-emitting region at a tip remote from a mounting end at which said bimorph is connected to said base;
    said bimorph having an internal light guide to guide light from said light source to said tip;
    said bimorph changing shape in response to an applied stimulus so that application of said stimulus causes said bimorph light emitting region to be displaced;
    said light-emitting region being positioned so that said light diverging from said light-emitting region is focused on said target surface and said bimorph being oriented with respect to said focusing optical element and said target surface so that when said light emitting region is displaced, said light diverging from said light-emitting region remains in focus on said target surface.

15. A scanning device for scanning a target surface, comprising:
    a base having a focusing optical element of approximately 1:1 magnification;
    a flexible element with a light source, cantilever-mounted to said base, having a light-emitting region at a tip remote from a mounting end at which said flexible element is connected to said base;
    light from said light source diverging from said light-emitting region with a numerical aperture of approximately 0.5;
    said flexible element being of a material which changes shape in response to an applied stimulus so that application of said stimulus causes said flexible element to bend;
    said light-emitting region being positioned so that said light diverging from said light-emitting region is focused on said target surface and said flexible element being oriented with respect to said focusing optical element and said target surface so that when said flexible element bends, said light diverging from said light-emitting region remains in focus on said target surface.

16. A scanning device for scanning a target surface, comprising:
    a base;

a flexible element cantilever-mounted to said base;

said flexible element having a light source and a light-emitting region at a tip remote from a mounting end at which said flexible element is connected to said base;

said flexible element being of a material that changes shape in response to an applied stimulus so that application of said stimulus causes said flexible element to bend;

said light-emitting region being positioned so that said light emitted from said light-emitting region is directly projected onto said target surface to form a light spot for scanning; and said flexible element being oriented with respect to said focusing optical element and said target surface so that when said flexible element bends, said tip remains substantially fixed distance from said target surface, whereby said light spot remains a fixed size.

17. A scanning device for scanning a target surface, comprising:

a base;

a flexible element cantilever-mounted to said base;

said flexible element having a light source and a light-emitting region at a tip remote from a mounting end at which said flexible element is connected to said base;

said flexible element having at least a portion that is of conductive material;

said base having an electrode adjacent said conductive portion;

said base having a source of alternating voltage applied between said conductive portion and said electrode, whereby said flexible element is forced alternately in opposite directions by an electric field between said electrode and said conductive portion;

said light-emitting region being positioned to project a light spot onto said target surface.

18. A device as in claim 17, wherein said electrode is positioned in a direction perpendicular to a light path leading from said tip to said light spot.

19. By A scanning device for scanning a target surface, comprising:

a flexible element with a light source, cantilever-mounted to said base, having a light-emitting region at a tip remote from a mounting end at which said flexible element is connected to said base;

said flexible element being of a material which changes shape in response to an applied stimulus so that application of said stimulus causes said flexible element to bend;

said light-emitting region being positioned so that said light diverging from said light-emitting region is focused on said target surface and said flexible element being oriented with respect to a focusing optical element and said target surface so that when said flexible element bends, said light diverging from said light-emitting region remains in focus on said target surface;

said flexible element including a light guide conducting light between said light source and said light-emitting region at said tip;

an oscillating motor connected to said flexible element that applies said stimulus causing said flexible element to bend in an oscillating manner at an oscillating frequency;

said light guide being of a material having a defect migration rate less than a frequency of said oscillating frequency.

* * * * *